(12) United States Patent
Fuqua et al.

(10) Patent No.: US 6,522,469 B1
(45) Date of Patent: Feb. 18, 2003

(54) TUNABLE SOLID STATE THIN FILM OPTICAL FILTER

(75) Inventors: Peter D. Fuqua, Redondo Beach, CA (US); James D. Barrie, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 09/956,417

(22) Filed: Sep. 19, 2001

(51) Int. Cl.[7] .............................................. G02B 27/00
(52) U.S. Cl. ...................................................... 359/578
(58) Field of Search ................................ 359/577, 578, 359/579, 260; 372/102

(56) References Cited

U.S. PATENT DOCUMENTS 6,317,251 B1 * 11/2001 Wang .......................... 359/318

* cited by examiner

*Primary Examiner*—Mark A. Robinson
*Assistant Examiner*—Alessandro V. Amari
(74) *Attorney, Agent, or Firm*—Derrick Michael Reid

(57) ABSTRACT

A thin film electrical optical filter includes a thin film electrooptical dielectric having a voltage controlled electrooptical refractive index that is disposed between opposing stacks of alternative layers having differing refractive indices for transmitting received incident light through a target passband. An applied voltage to the electrooptical dielectric can serve to alter the actual passband to the target passband for compensating for thin film manufacturing tolerances for producing controllable optical filters with precise passbands.

18 Claims, 2 Drawing Sheets

TUNABLE OPTICAL THIN FILM FILTER

TUNABLE OPTICAL THIN FILM FILTER

REFRACTIVE INDEX PROFILE

TRANSMISSION SPECTRA

THREE CAVITY FILTER TRANSMISSION SPECTRUM

TUNABLE SOLID STATE THIN FILM OPTICAL FILTER

FIELD OF THE INVENTION

The invention relates to the field of thin film optical devices. More particularly, the present invention relates to transparent electroactive cavity thin film optical filters.

BACKGROUND OF THE INVENTION

Highly accurate optical interference filters can be manufactured using thin film deposition processes. These devices are typically built by depositing alternating layers of transparent materials where one layer possesses a much larger refractive index relative to the other layer. Theoretically, the proper choice of composition, thickness and quantity of layers could result in a device with any desired transmission spectrum. Among the simplest devices is the single cavity bandpass filter, that is the thin-film form of an etalon. This device consists of three sets of layers. The first stack is a dielectric mirror. This is followed by a thicker layer that forms the spacer. This is followed by another stack that forms a dielectric mirror. The mirror stacks are typically fabricated by depositing alternating transparent materials that have an optical thickness that is one quarter of the optical wavelength of light. To achieve the theoretical optical performance, each layer must possess a precise and specific physical thickness and refractive index. Any non-uniformity in the deposition of the layers can affect the spectral placement and transmission or reflection characteristics of the device. A design that requires very tight manufacturing tolerances over large substrate areas could result in the costly rejection of many devices. Given these manufacturing limits, it would be desirable to analyze the devices after construction and alter the devices that do not meet a predetermined optical transmission or reflection specification by some electrical or mechanical means. For example, if the peak transmission wavelength of a manufactured optical bandpass cavity filter was slightly out of tolerance, it would be desirable to have a means for shifting the peak back to the desired spectral location. It is also desirable that the optical filters have precise rejection bands and passbands that are electrically or mechanically selectable.

Mechanical methods of achieving a variable transmission spectrum device are well known. This includes changing a prism or grating angle, or altering the optical spacing between mirrors of an etalon. To overcome the performance, size and cost disadvantages of using mechanical schemes, many have conceived of electrical methods for varying a transmission spectrum. For example, U.S. Pat. No. 5,150,236 issued Sep. 22, 1999 discloses a tunable liquid crystal etalon filter. The liquid crystal fills the space between dielectric mirrors. Electrodes on the mirrors are used to apply an electric field, which changes the orientation of the liquid crystal that changes the optical length for tuning. The change in the optical length corresponds to a change in the location of the passband. In addition, U.S. Pat. No. 5,103,340 issued Apr. 07, 1992 discloses piezoelectric elements placed outside the optical path, which are used to change the spacing between cascaded cavity filters. Furthermore, U.S. Pat. No. 5,799,231 discloses a variable index distributed mirror. This is a dielectric mirror with half of the layers having a variable refractive index that is matched to other layers. Changing the applied field increases the index difference that increases the reflectance. The mathematics that describe the transmission characteristics of multilayer films composed of electro-optic and dielectric materials are well known.

Another electrically actuated thin film optical filter uses a series of crossed polarizers and liquid crystalline layers that allow electrical controls to vary the amount of polarization rotation in the liquid by applying an electric field in such a way that some wavelengths are selectively transmitted. However, these electrically actuated thin film optical filters have the characteristic that the light must be polarized and that the frequencies of light not passed are absorbed, not reflected. Another electrically actuated thin film optical device is the tunable liquid crystal etalon optical filter. The tunable liquid crystal etalon optical filter uses a liquid crystal between two dielectric mirrors. U.S. Pat. No. 5,710,655 issued Jan. 20, 1998 discloses a cavity thickness compensated etalon filter.

The common cavity filter, such as the etalon optical filter, is an optical filter with one or more spacer layers that are deposited in the stack and that define the wavelength of the rejection and pass bands. The optical thickness of the film defines the placement of the passband. In the tunable liquid crystal etalon optical filter, an electric field is applied to the liquid crystal that changes the optical length between the two mirrors so as to change the passband of the etalon. Still another tunable optical filter device tunes the passband by using piezoelectric elements to mechanically change the physical spacing between mirrors of an etalon filter. Bulk dielectrics are made by subtractive methods like polishing from a larger piece; whereas thin film layer are made by additive methods like vapor or liquid phase deposition. A bulk optical dielectric, for example, greater than ten microns, disposed between metal or dielectric mirrors suffer from excessive manufacturing tolerances and costs, the bulk material providing unpredictable, imprecise, irregular, or otherwise undesirable passbands. These electrical and mechanical optical filters disadvantageously do not provide precise rejection bands and passbands that are repeatably manufactured. These and other disadvantages are solved or reduced using the invention.

SUMMARY OF THE INVENTION

An object of the invention is to provide a tunable optical interference filter.

Another object of the invention is to provide a tunable optical filter with stable rejection and passbands having electrooptic medium.

Yet another object of the invention is to provide tunable optical filter with stable rejection and passbands manufactured using conventional thin film deposition processes.

Still another object of the invention is to provide tunable optical filter with stable rejection and passbands that is polarization insensitive.

A further object of the invention is to provide a tunable optical filter with stable rejection with stacked cavities made of transparent electroactive material forming an optical cavity.

Yet a further object of the invention is to provide a tunable optical filter with stable rejection and passbands using a series of optical cavities made of transparent electroactive materials forming an optical device having a refractive index that changes the resonant wavelength with an applied voltage to provide a tunable passband shift.

The invention is directed to a thin film tunable optical filter that provides highly accurate passbands yet manufactured using conventional manufacturing processes. After fabrication, the optical properties of the filter are stable with a degree of tunability. A tuning voltage is applied to an optical interference stack that shifts spectral features such as the transmission passband by a predetermined amount. The optical filter includes the use of a solid state electrooptic medium manufactured in a single chamber using conventional thin film deposition processes that grow transmissive material in layers of up to ten microns. Passband tuning occurs without moving any of the elements so that the optical filter is robust and vacuum compatible. The optical filter is polarization insensitive and reflects energy not transmitted with many applications including multiplexing and demultiplexing of optical signals.

The optical filter uses a tunable spacer. One or more spacer transparent electroactive material spacer layers are deposited in the stack to define the resonant wavelength of the device. The use of multiple electrooptic spacer layers as coupled cavities serve to widen and narrow the optical passband. The use of materials compatible with the single chamber deposition process provides a manufacturable monolithic device. The optical thickness of the film spacer layers defines the spectral placement of the passband. The solid state electrooptic material enables changes in the optical thickness of the spacer layers to shift the passband wavelength. The use of multiple spacers function to electrically alter multiple coupled cavities and thus shift the passbands. The optical filter can be controlled to electrically narrow or broaden the spectral width of the passband. When the passbands overlap, one spacer layer can define the long wavelength band edge and another spacer layer can define the short wavelength edge. The refractive index changes in response to changes in an applied tuning voltage producing changes in the resonant wavelength to shift the passband.

The electroactive cavity is disposed between a transparent conductor like indium tin oxide or very thin metal to deliver the charge. The conductive layer can be patterned so that the filter is divided into pixels that are individually addressable over the surface of the filter. Patterning the transparent conductor provides an addressable array of tunable filters. Pixelization is useful in improving uniformity over a large optical area. When applied in conjunction with a detector array, pixelization allows proximal detector elements to be illuminated with different spectra of light.

Parallel production of monolithic optical filters significantly reduces cost. The layers are deposited as a repeatable multilayer stack on a large wafer that can then be diced into very small pieces. Each piece can be tested for wavelength placement and band shape. With repeatable fabrication processes identical filters can be used for multiple channel application. Each filter may have a slightly different voltage due to small manufacturing tolerances that can be compensated by changing the applied field. A set of filters can be manufactured as a single stage demultiplexer that could be tuned to any channel desired to eliminate the need for the whole filter set. The compensating applied voltage can be programmed to compensate for temperature dependence as well. These and other advantages will become more apparent from the following detailed description of the preferred embodiment.

DETAILED DESCRIPTION OF THE PREFERRED EMBODIMENT

Figure 1:
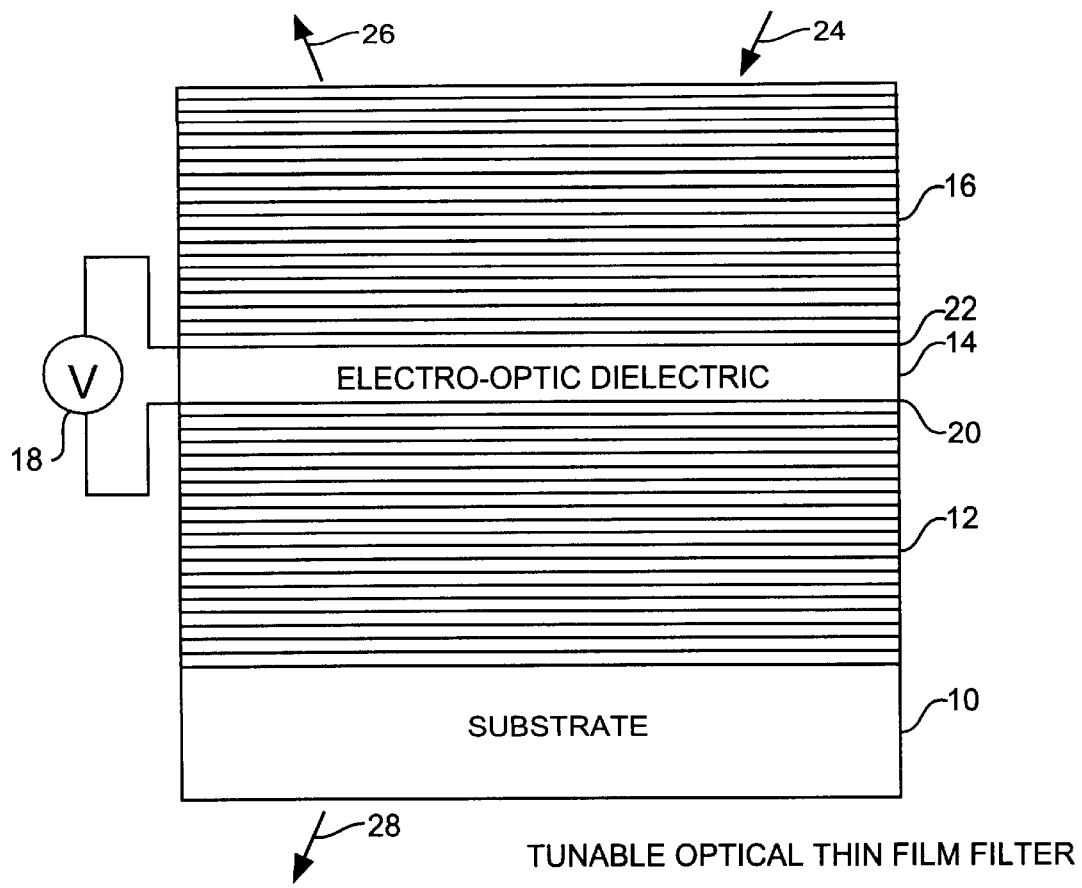
FIG. 1 is a diagram of a tunable solid state thin film optical filter.
Figure 2:
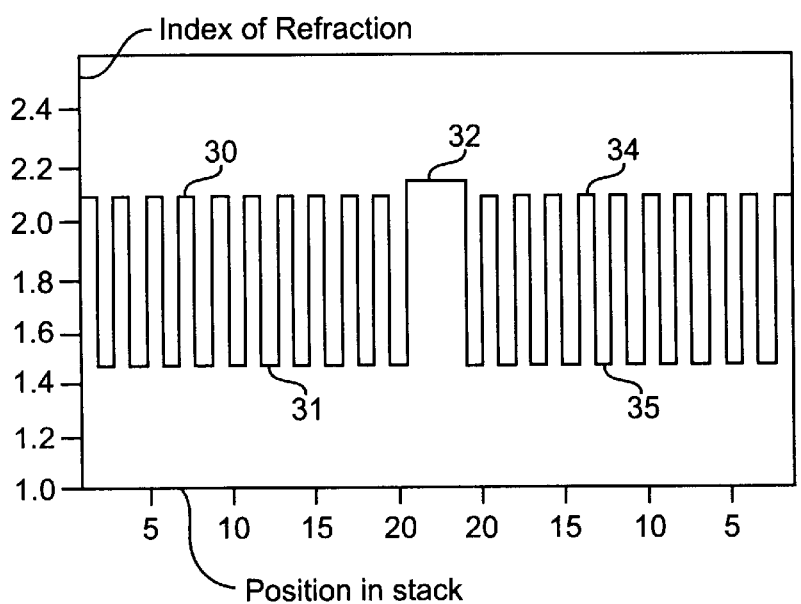
FIG. 2 is a graph of a refractive index profile of the optical filter.
Figure 3:
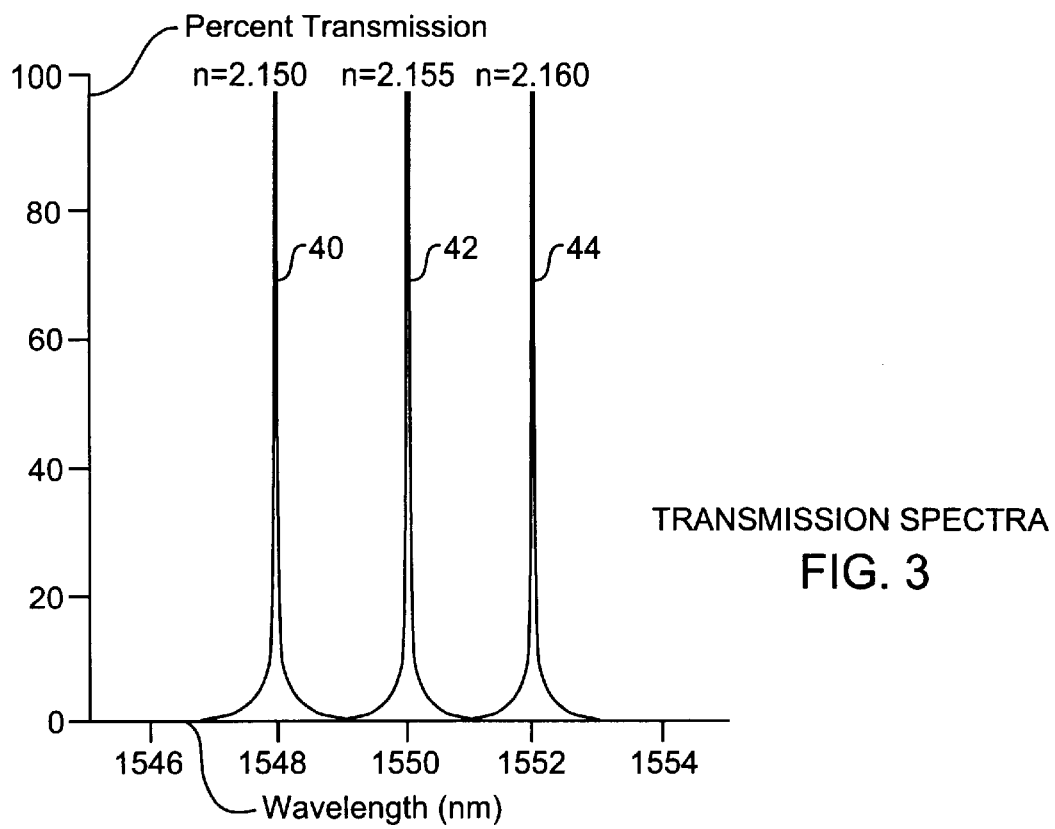
FIG. 3 is a graph of transmission spectral through the optical filter.
Figure 4:
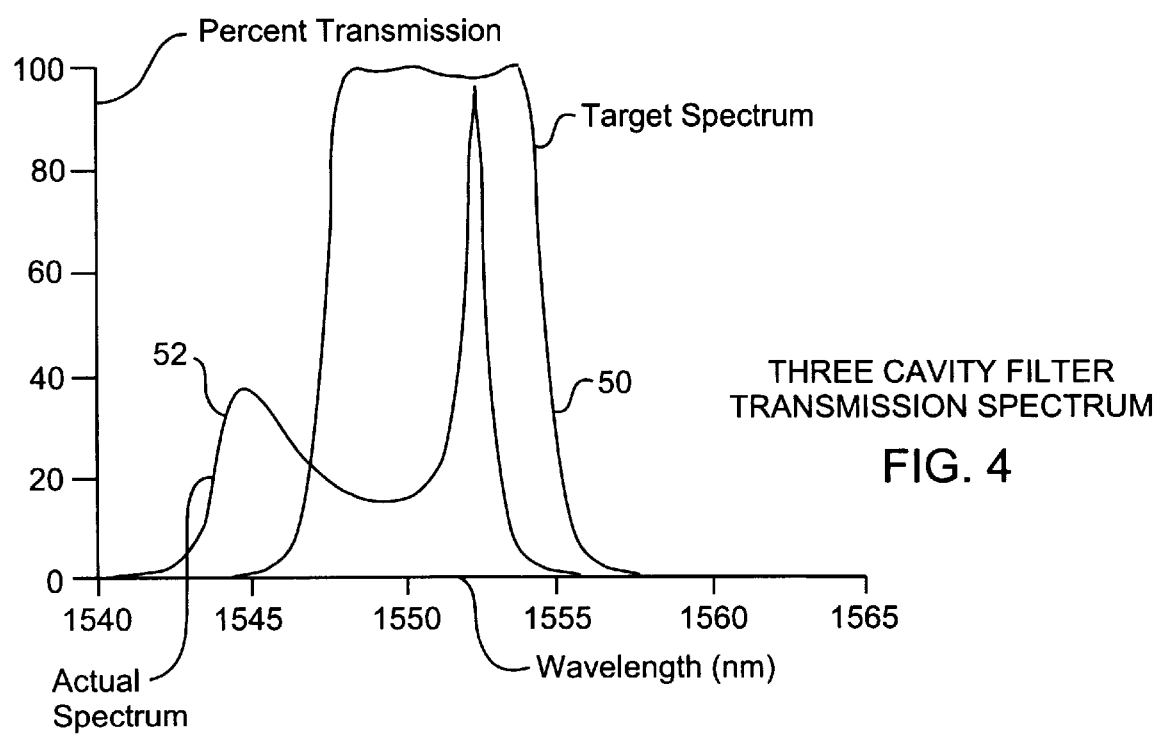
FIG. 4 is a graph of an actual and target transmission spectra of a three cavity optical filter.

An embodiment of the invention is described with reference to the figures using reference designations as shown in the figures. Referring to FIG. 1, a substrate 10 is used to support a lower dielectric stack 12, an electrooptic layer 14 and an upper dielectric stack 16. A voltage source 18 is externally applied across the electrooptic layer 14. A lower conductive layer 20 is disposed between the electrooptic layer 14 and the lower dielectric stack 12. An upper conductive layer 22 is disposed between the electrooptic layer 14 and the lower dielectric stack 16. The tunable optical filter receives incident light 24, and reflects back reflected light 26 while passing transmitted light 28.

The lower and upper dielectric stacks 12 and 16 preferably contain alternative dielectric layers made of materials having respective high and low refractive indices. As such, each stack contains a plurality of sets of layers with each set, in the preferred form, consisting of two layers each having a respective refractive index. The stacks 12 and 16 may comprise any number of sets of layers, but preferably include five or more sets. Each set of layers may have the same number of identical layers. The plurality of layers in each set is two or more, and is preferably two so that both of the stacks 12 and 16 have only two alternating layers with two respective refractive indices. The preferred lower stack 12 has low and high alternating refractive indices 30 and 31, and the preferred upper stack 16 could have the same low and high alternating refractive indices 35 and 34. The electrooptic dielectric has an electrooptic refractive index 32 that can be controlled by the voltage source 18 by an applied voltage.

Referring to all of the Figures, the voltage source 18 is varied to apply the applied voltage so as to change the electrooptic refractive index 32. When changing the electrooptic refractive index, the passband of the filter shifts, for example, from a low passband having low voltage transmission spectrum 40, to medium passband having medium voltage transmission spectrum 42, and to a high passband having a high voltage transmission spectrum 44. By varying the applied voltage, the thin film optical filter functions to select a desired passband.

In another aspect, the thin film electrooptical filter can be used to correct for unacceptable tolerances in conventional thin film processes. The thin film electrooptical filter is conventionally designed using standard semiconductor processes. The processes are set so that the thin film electrooptical filter has a target passband having a target spectrum 50. However, due to variances in the deposition process, yields of the thin film electrooptical filter having the target passband are often not achieved due to unacceptable high process tolerances, and produce poorly functioning thin film electrooptical filters. The applied voltage can be set to a correction voltage to compensate for these fabrication tolerances by shifting the actual passband to the target passband. The passband shift is relatively small but is sufficient in a functioning filter to correct for the fabrication tolerances where the actual passband does not substantially overlap the target passband.

The thin film optical filter functions to receive the incident light 24 that becomes either transmitted light 28 or reflected light 26 with insignificant light absorption. The optical filter transmits the transmitted light 28 within the passband and reflects the reflected 26 light outside of the passband. The external voltage source provides the applied voltage for selecting the desired passband. The electrooptical dielectric 14 has a thin film of predetermined thickness and an electrooptical refractive index that is controlled by the applied voltage that establishes a desired electric field through the electrooptical dielectric 14 between the two conductive layers 20 and 22. The electrooptical refractive index is selected by the applied voltage to select the desired passband. The optical filter then communicates the transmitted light 28 within the passband and reflects the reflected light 26 outside the passband.

The upper stack of thin film layers 16 is disposed on the electrooptical dielectric 14 that is in turn disposed on the lower stack of layers 12 that is in turn disposed on the substrate as an integrated thin film device. The layers of the upper stack-16 have respective thicknesses and respective refractive indices so that each of the uppers layers reflect an upper portion of the incident light. Likewise, the lower stack 12 of thin film layers also preferably have similar respective thicknesses and refractive indices so that each layer also reflects lower portion of the incident light. The electrooptical refractive index of the electrooptical dielectric 14 is controlled by the applied voltage. The electrooptical dielectric optically couples the reflections in phase sensitivity so that reflected lower portion from the lower stack 12 cancels in a desired amount the reflected upper portion of reflected light in the upper stack 16 so as to control the amount of reflected light 26. The optical filter increases the transmitted light 28 within the target passband when the electrooptical dielectric 14 is suitably controlled by the applied voltage during transmission when the electrooptical refractive index is adjusted to adjust the phase of the incident light 24 passing through the electrooptical dielectric 14. The phase difference between the lower portion of the reflected light 26 and the upper portion of the reflected light 26 can be increased for increased or decreased cancellation of the upper portion of reflected light 26. The phase difference applied voltage control is for increasing or decreasing the amount of transmitted light 28 within the passband while concomitantly decreasing the amount of reflected light 26 within the passband. Hence, the applied voltage shifts the passband to increase or decrease the amount of transmitted light 28 with the selectably controlled applied voltage. In the case where the incident light 24 is monochromatic, that is, consisting of a narrow distribution of wavelengths, the passband can be controlled so that in the presence of the first applied voltage, the passband transmits all of the incident light 24 as the transmitted light 28, and in a second applied voltage, to reflect all of the incident light 24 as the reflected light 26.

The thin film optical filter can be used in the telecommunications industry that uses narrow, fixed wavelength filters to demultiplex signals on each optical fiber using dense wavelength division multiplexing. One of the limits to the number of channels available per fiber is the ability to manufacture very narrow, accurate filters. Each channel is determined by a carrier wavelength of light. The thin film electrooptical filter can be used for demultiplexing the different optical channels. The channels can be selected using one selecting thin film electrooptical filter having a passband shift using a varying controlled applied voltage. The channels can equivalently be selected using a series of bandpass filters with each filter is controlled by a static applied voltage to select and hence pick off a designated wavelength of light and route that the channel of light to another device.

The thin film electrooptical filter could also be used in the manufacture of lasers. The thin film electrooptical filter can be equipped with a mirror where the passband could be modulated providing an alternative way to mode-lock a laser. The thin film electrooptical filter could also be used for remote sensing for imaging through very narrow filters that can be tuned around the IR absorption bands of interesting compounds. The thin film electrooptical filter could also be used for rocket plume detection to detect an IR signature of a launch from space. The thin film electrooptical filter can provide flexibility to shift the optical system transmission band farther into the atmospheric absorption band to optimize for different atmospheric conditions. Those skilled in the art can make enhancements, improvements, and modifications to the invention, and these enhancements, improvements, and modifications may nonetheless fall within the spirit and scope of the following claims.

What is claimed is:

1. A thin film optical filter for receiving incident light and for transmitting transmitted light from the received incident light within a passband and for reflecting reflected light from the received incident light outside the passband, the thin film optical filter comprising, an external voltage source for providing an applied voltage, an electrooptical dielectric having a thin film thickness and an electrooptical refractive index for receiving the applied voltage and for communicating the transmitted light and for supporting an electrical field created by the applied voltage, the electrooptical refractive index being controlled by the applied voltage, an upper stack of thin film upper layers disposed on the electrooptical dielectric, the upper layers of the upper stack having respective thin film thicknesses and respective refractive indices so that each of the uppers layers reflect a portion of the incident light so that the upper layers reflect an upper reflected portion of the incident light during transmission and reflection of the incident light, and a lower stack of thin film lower layers, the lower layers of the lower stack having respective thicknesses and refractive indices so that each layer reflects a portion of the incident light so that the lower layers reflect a lower reflected portion of the incident light, the lower reflected portion cancels the upper reflected portion of the light so as to reduce the reflected light and increase the transmitted light within the target passband when the electrooptical dielectric is controlled by the applied voltage during transmission when the electrooptical dielectric has a thickness and refractive index that adjusts the phase of light passing through the dielectric so as to adjust the phase of the lower reflected portion relative to the higher reflected portion for increasing cancellation of the upper reflected portion for increasing the transmitted light within the passband while decreasing the reflected light within the passband, the applied voltage serving to shift the passband, the transmitted light being within the passband in the presence of the applied voltage and outside the passband in the absence of the applied voltage.

2. The thin film optical filter of claim 1 wherein, the thicknesses of the thin film layers and electrooptic dielectric are predetermined thicknesses determined by thin film processes so that the passband is designed to be a target passband without application of the applied voltage, the filter has an actual passband different from the target passband after fabrication by the thin film processes in the absence of the applied voltage when the thicknesses are manufactured to be different from the predetermined thicknesses, and the applied voltage is applied to the filter so that the actual passband is shifted to the target passband.

3. The filter of claim 1 further comprising,
a upper conductive layer disposed between the electrooptical layer and the upper stack, and
a lower conductive layer disposed between the electrooptical layer and the lower stack, the upper and lower conductive layers for establishing an electrical field through the electrooptical layer, the voltage source applying the applied voltage across the upper and lower conductive layers for controlling the electrooptical refractive index.

4. The thin film optical filter of claim 1 wherein,
the thin film upper layers comprise a plurality of sets of layers, each set has the same number of layers, each of the layers in each set having respective different indices of refraction.

5. The thin film optical filter of claim 4 wherein,
the number of layers of each set is two so that thin film upper layers comprise a plurality of alternating layers having two respective refractive indices.

6. The thin film optical filter of claim 4 wherein,
the plurality of sets of layers is five or more sets of layers, and
the number of layers in each of the plurality of sets is two.

7. The filter of claim 1 wherein,
the incident light is a plurality of monochromatic light of a respective plurality of wavelengths from a respective plurality of light sources, and
the applied voltage is a plurality of selecting voltages for shifting the passbands to a respective plurality of selected passbands for selectively bandpassing the respective plurality of wavelengths for selectively transmitting the plurality of monochromatic light.

8. The filter of claim 1 wherein,
the upper and lower thin film layers are made from thin additive film deposition processes.

9. The filter of claim 1 wherein,
the electrooptical dielectric is made from a thin film additive deposition process.

10. The filter of claim 1 wherein,
the thicknesses of each of the upper and lower thin film layers are less than ten microns.

11. The filter of claim 1 wherein,
the thickness of the electrooptical dielectric is less than ten microns.

12. The filter of claim 1 wherein,
the incident light is a pixel of an optical field,
the applied voltage controls the filter to filter the incident light as a processed pixel of the optical field.

13. The filter of claim 1 wherein,
the filter is one of a plurality of like filters in a monolithic array of filters, and
the applied voltage is a plurality of applied like voltages respectively applied to the filters of the monolithic array.

14. The filter of claim 1 wherein,
the thickness of the electrooptical dielectric is greater than the thicknesses of the thin film layers.

15. The filter of claim 1 wherein,
the respective refractive indices of the thin film layers alternate between a high refractive index and a low refractive index through both of the upper and lower stacks of thin film layers.

16. A thin film optical filter for receiving incident light and for transmitting transmitted light from the received incident light within a passband and for reflecting reflected light from the received incident light outside the passband, the thin film optical filter comprising,
one or more external voltage sources for respectively providing one or more applied voltages,
one or more electrooptical dielectrics arranged in a dielectric sequence and each having respective thin film thicknesses and respective electrooptical refractive indices for respectively receiving the one or more applied voltages and for communicating the transmitted light and for respective supporting one or more electrical fields respectively created by the one or more applied voltages, the one or more electrooptical refractive indices being controlled by the respective one or more applied voltages, and
two or more stacks of thin film layers arranged in a stacking sequence, the number of stacks is one greater than the number of electrooptical dielectrics, each of the one or more electrooptical dielectrics is disposed between two successive stacks of the two or more stacks of thin film layers, each of the thin film layers having respective thicknesses and respective refractive indices so that each of the layers reflect a portion of the incident light and transmit a portion of the incident light, a second reflected portion of incident light reflected by a second one of the stacks serving to cancel a first reflected portion of reflected light of a first one of the stacks so that the second reflected portion cancels the first reflected portion of the light so as to reduce the reflected light and increase the transmitted light within the target passband when the one or more electrooptical dielectrics are controlled by the one for more applied voltages during transmission when the one or more electrooptical dielectrics have thicknesses and refractive indices that adjusts the phase of light passing through the dielectrics so as to adjust the phase of the lower reflected portion relative to the higher reflected portion for increasing cancellation of the upper reflected portion for increasing the transmitted light within the passband while decreasing the reflected light within the passband, the one or more applied voltages serving to shift the passband, the transmitted light being within the passband in the presence of the one or more applied voltages and outside the passband in the absence of the one or more applied voltages.

17. The thin film optical filter of claim 16 wherein,
the thicknesses of the thin film layers and electrooptic dielectrics are predetermined thicknesses determined by thin film processes so that the passband is designed to be a target passband without application of the applied voltages,
the filter has an actual passband different from the target passband after fabrication by the thin film processes in the absence of the applied voltage when the thicknesses are manufactured to be different from the predetermined thicknesses, and
the applied voltages are applied to the filter so that the actual passband is shifted to the target passband.

18. A thin film optical filter for receiving incident light and for transmitting transmitted light from the received incident light within a passband and for reflecting reflected light from the received incident light outside the passband, the thin film optical filter comprising,
an external voltage source for providing an applied voltage, an electrooptical dielectric having a thin film thickness and an electrooptical refractive index for receiving the applied voltage and for communicating the transmitted light and for supporting an electrical field created by the applied voltage, the electrooptical refractive index being controlled by the applied voltage, the electrooptical dielectric is made from a thin film deposition additive process, an upper stack of thin film upper layers disposed on the electrooptical dielectric, the upper layers of the upper stack having respective thicknesses and respective refractive indices so that each of the upper layers reflect a portion of the incident light so that the upper layers reflect an upper reflected portion of the incident light during transmission and reflection of the incident light, and a lower stack of thin film lower layers, the lower layers of the lower stack having respective thicknesses and refractive indices so that each layer reflect a portion of the incident light so that the lower layers reflect a lower reflected portion of the incident light, the lower reflected portion cancels the upper reflected portion of the light so as to reduce the reflected light and increase the transmitted light within the target passband when the electrooptical dielectric is controlled by the applied voltage during transmission when the electrooptical dielectric has a thickness and refractive index that adjusts the phase of light passing through the dielectric so as to adjust the phase of the lower reflected portion relative to the higher reflected portion for increasing cancellation of the upper reflected portion for increasing the transmitted light within the passband while decreasing the reflected light within the passband, the applied voltage serving to shift the passband, the transmitted light being within the passband in the presence of the applied voltage and outside the passband in the absence of the applied voltage, the thin film thicknesses of the electrooptic dielectric and the thin film thicknesses of the upper and lower thin film layers being predetermined thicknesses determined by thin film processes so that the passband is designed to be a target passband without application of the applied voltage, the filter having an actual passband different from the target passband after fabrication by the thin film processes in the absence of the applied voltage when the thicknesses are manufactured to be different from the predetermined thicknesses, and the applied voltage being applied to the filter so that the actual passband is shifted to the target passband, and the upper and lower thin film layers being made from additive thin film deposition processes.

* * * * *